Aug. 13, 1929.　　　C. H. BEHNKE　　　1,724,550
RETAINING DEVICE FOR CAPS
Filed April 13, 1927
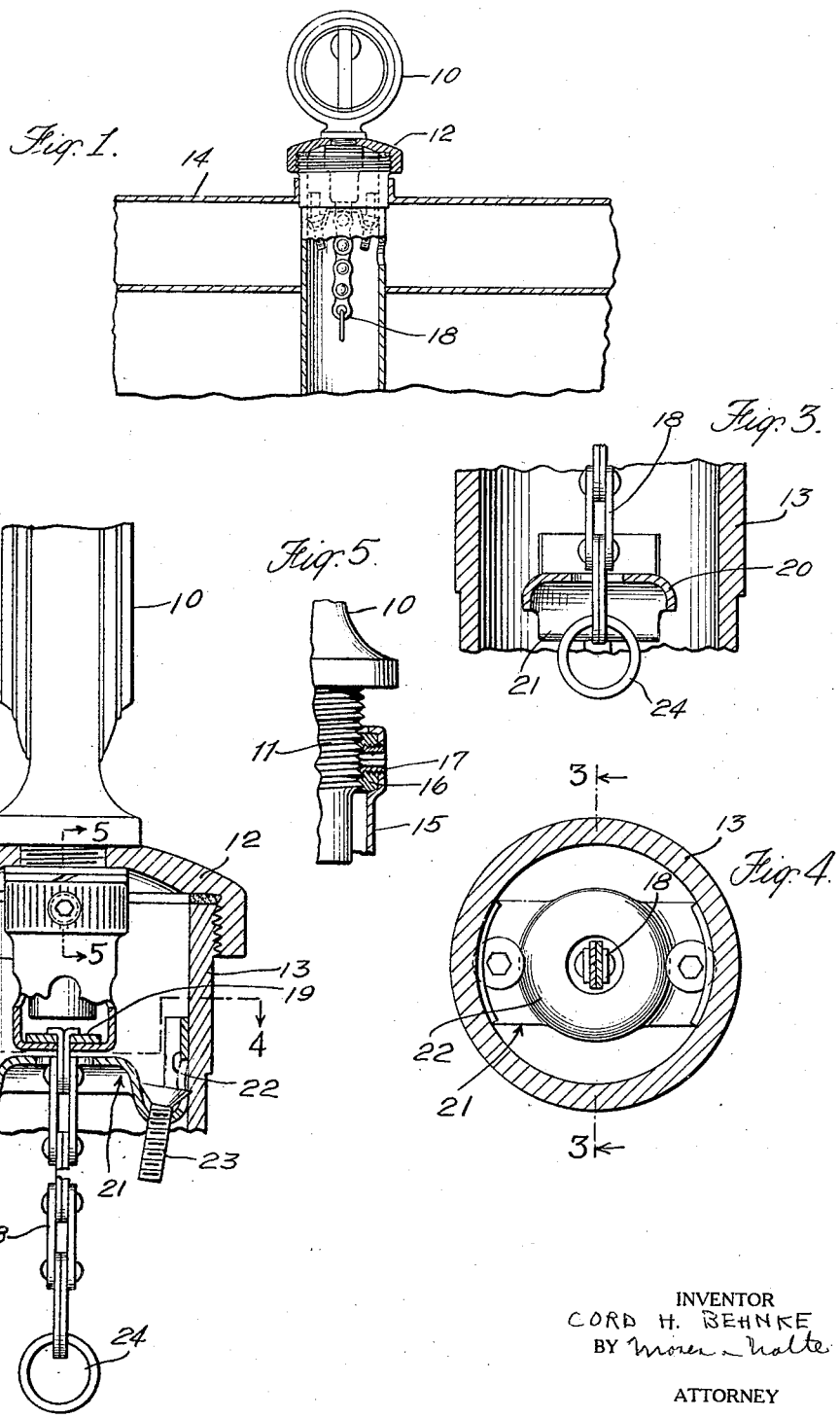
INVENTOR
CORD H. BEHNKE
BY
ATTORNEY Patented Aug. 13, 1929.

1,724,550

UNITED STATES PATENT OFFICE.

CORD H. BEHNKE, OF FLUSHING, NEW YORK, ASSIGNOR TO THE MOTOMETER COMPANY, INC., OF LONG ISLAND CITY, NEW YORK, A CORPORATION OF NEW YORK.

RETAINING DEVICE FOR CAPS.

Application filed April 13, 1927. Serial No. 183,259.

This invention relates to retaining devices for radiator caps for automobiles and especially for radiator caps equipped with instruments now in general use, and the general object of the invention is to provide a new and improved retaining device including a part which is secured positively to the radiator neck, is simple in structure and economical to manufacture, and is very effective to prevent theft of a cap or of a cap and an attached instrument.

Other features and advantages will hereinafter appear.

The invention will be understood from the following description, taken in connection with the accompanying drawings, in which:

Figure 1 is a vertical sectional view illustrating one embodiment of the invention;

Figure 2 is a detail sectional view on a larger scale of structure shown in Figure 1;

Figure 3 is a fragmentary sectional view taken along the line 3—3 of Figure 4;

Figure 4 is a sectional view on the line 4—4 of Figure 2; and

Figure 5 is a detail view illustrating the manner of locking the retaining device on the threaded stem of an instrument on the radiator cap.

Referring to the drawing, the invention is illustrated in connection with the heat indicating instrument 10 of a well known form having a threaded stem 11 attached to project through a hole in a radiator cap 12 which may be threaded internally to screw on the threaded end of a neck 13 projecting from a radiator 14. The instrument 10 may be secured to the radiator cap 12 in a manner to be described hereinafter. The securing device is shown as including a shell 15 embracing at its upper end a threaded ring 16 which may be screwed on the threaded portion of the stem 11 until the shell at its upper end engages one or more packing rings and forces them against the lower surface of the cap 12, thus clamping the instrument 10 to the cap 12. The shell 15 and ring 16 are held against turning with reference to the threaded stem 11 by means of a set screw 17 (Figure 5). Preferably this set screw 17 is provided with an opening which may be hexagonal in section and into which may be inserted the end of a suitable implement for turning the set screw. When the set screw is tightened, the cavity in the set screw may be filled with relatively soft material, such as lead, to prevent the insertion of an implement to loosen the screw.

At its lower end the shell 15 is connected with a chain 18 having at its upper end two links passing through an opening in the bottom of the shell 15 and an opening in a disc 19 within the shell and of sufficient size to prevent passage thereof through the bottom of the shell, and bent outwardly to overlie the upper surface of said disc 19 and attach the chain thereto.

The chain extends downwardly through an opening in a generally U-shaped anchor member 21 having an upwardly convex central cam boss 20. The member 21 comprises upwardly extending portions 22 to contact with the inner surface of the neck 13 and effect proper positioning of the device across the opening in the radiator neck. Between the edges of the cam member 20 and the upright portions 22 of the member 21, the latter is curved downwardly and provided in the downwardly curved portion with internally threaded openings to receive the threaded shanks of screws 23, the portions 22 of the member 21 being cut away to permit the heads of screws 23 to come into contact with the inner surface of the neck 13. The chain 18 after having been passed downwardly through a central opening in the member 21 is secured against removal through said opening by inserting through links at the lower end of the chain a ring 24 which is of too great diameter to pass through the opening and split in any suitable manner to facilitate application to said links.

The retaining device may be installed in the following manner: The screws 23 are inserted in the threaded openings in the member 21 but left with their heads sufficiently high to be substantially above the curved upper surface of the cam 20. The retaining device may then be inserted in the neck 13 of the radiator, and, when it is brought to its proper position, the screws 23 may be screwed downwardly into the member 21. As this operation of the screws is continued, the screw heads which may be similar in form to the heads of ordinary wood screws, engage the curved surface of the cam 20, and are forced outwardly toward the inner surface of the neck 13 and finally the sharp edges of their heads will be pressed strongly against the inner surface of the retaining neck and may actually bite into the metal of the neck thus affording a very strong connection between the retaining device and the radiator neck 13. The shell 15 of the retaining device may be secured to the threaded neck 11 of the instrument 10 either before the retaining device has been secured in the radiator neck 13 or after such insertion.

The heads of the screws 23 may be provided with polygonal sockets for enabling them to be operated by a suitable wrench, and these sockets may be plugged with lead shots to interfere with retraction of the screws after they have been inserted to holding position.

It will be apparent that various changes may be made in the construction and arrangement of the parts and that certain parts may be used without others without departing from the true spirit and scope of the invention.

I claim:

1. A retaining device for permanently securing a radiator cap to the neck of a radiator, including a member insertable in said neck, a screw having a head threaded into said member, and means cooperating with the screw as it is screwed down to effect a locking engagement between the screw head and said neck.

2. A retaining device for permanently securing a radiator cap to the neck of a radiator, including a member insertable in said neck, a screw having a head and threaded into said member for upward and downward movement, and means cooperating with the screw as it is screwed down to force the screw head against the inner surface of said neck.

3. A retaining device for permanently securing a radiator cap to the neck of a radiator, including a member insertable in said neck, a screw having a head and threaded into said member for upward and downward movement, and a cam on said member acting to force the screw head against the inner surface of said neck.

4. A retaining device for permanently securing a radiator cap to the neck of a radiator, including a member insertable in said neck and having a cam surface, and screw members threaded into said member for upward and downward movement and having means thereon arranged to engage said cam and be forced outwardly thereby to grip the inner surface of said radiator neck.

5. A retaining device for permanently securing a radiator cap to the neck of a radiator, including a member insertable in said neck and formed with a central cam and with arms extending from the lower side of said cam to the inside surface of the radiator neck and then longitudinally of the neck to assist in guiding and positioning said member, and screws threaded into said arms and having heads to engage the cam and be forced thereby against the inner surface of said neck.

6. A retaining device for permanently securing a radiator cap to the neck of a radiator, including a member insertable in said neck and formed with a central upwardly convex cam, arms projecting laterally from said cam to the inner surface of the neck and upwardly along said surface, said arms having threaded openings adjacent the cam and also openings in the upright portions, and screws threaded into said threaded openings and having relatively large heads to engage said cam and be forced thereby through the openings in the upright portions of said arms and effect a locking engagement with said radiator neck.

In testimony whereof I have affixed my signature to this specification.

CORD H. BEHNKE.